Jan. 17, 1928.
O. K. WARWICK
1,656,654
LOCKING DEVICE FOR TIRE CARRIERS FOR AUTOMOBILES
Filed May 5, 1922
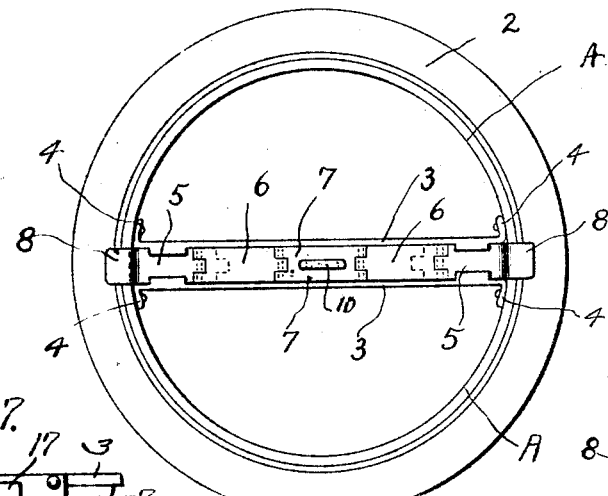
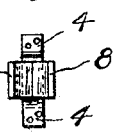
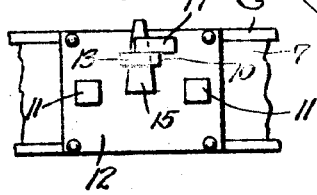
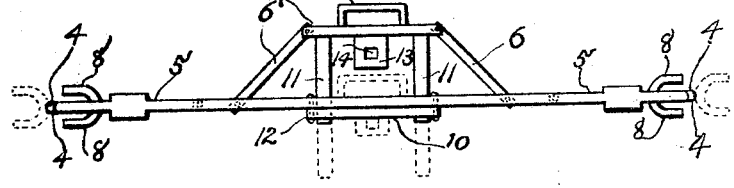
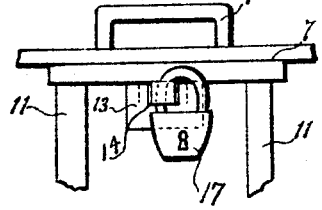
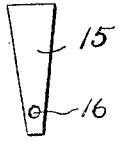
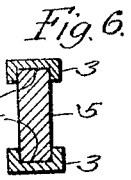
INVENTOR.
Orlo K. Warwick
BY F. N. Gilbert
ATTORNEYS.

Patented Jan. 17, 1928.

1,656,654

UNITED STATES PATENT OFFICE.

ORLO K. WARWICK, OF BINGHAMTON, NEW YORK.

LOCKING DEVICE FOR TIRE CARRIERS FOR AUTOMOBILES.

Application filed May 5, 1922. Serial No. 558,797.

My invention relates to improvements in locking means for tire holders on automobiles and it has for its object to simplify and cheapen the construction, said locking means to be applied to tire carriers for automobiles. My device relates especially to ring carriers and provides an effective means whereby a rigid locking device may be applied to any of the usual form of ring carriers on automobiles. With these objects in view, my invention consists of several novel features of construction and arrangement of parts, as will more fully appear in the accompanying drawings and are pointed out in the claims hereto, reference being had to said accompanying drawings in which:—

Fig. 1 is a front view of my device as applied to a ring carrier.

Fig. 2 is an end view of my device.

Fig. 3 is a plan view of my device.

Fig. 4 is a plan view of a fragmentary part of my device.

Fig. 5 is an elevation of a part of my device.

Fig. 6 is a vertical sectional view of my device taken on line 6—6 of Fig. 1.

Fig. 7 is an elevation of the central portion of my device viewed from the rear.

The same reference characters denote like parts in each of the several figures of the drawings. In carrying out my invention, 1 represents a ring tire carrier made of metal and of the ordinary standard size, on which may be mounted a wheel rim and which forms a support for the latter. The rim and tire is designated by the numeral 2; the carrier ring being secured in the usual and ordinary manner to an automobile.

In the formation of my device, I have two parallel clamping bars 3 which may be formed of iron, said bars being recessed at 5ª, spaced apart and so disposed as to have their recesses opposing each other, and thereby forming a channel-way. The opposite ends of each bar may be turned up in a vertical position, forming the lugs 4 which are adapted to contact with and provide means for mounting the same within the carrier ring 1. These lugs 4 are perforated and through these and the rim body may be mounted rivets or other fasteners, providing a way for holding the bars firmly in place within the rim. Slidably mounted between the clamping bars 3, I have the locking member or support formed of a series of hinged sections 5 and 6 pivotally joined together and a central section 7. The locking member formed of the two outer sections on each end and a central locking section 7 terminates at each end in fork shaped lugs 8. In section 7 I have mounted a handle 9 on one side. On the other side of said section 7 I have provided two horizontal projecting guide pins or lugs 11 and between the guide pins projects the tongue 13 provided with an opening 14 adapted to receive a key wedge member 15, shown in detail in Fig. 5.

Connected to the parallel bars 3 is a brace plate 12 which brace plate is provided with an opening 10 to receive the tongue 13 of the member 7. This plate 12 may also be provided with suitable openings to receive the guide pins 11 as clearly shown in Fig. 7.

The wedge 15 may be provided with an opening 16 adapted to receive the hasp of the lock 17.

In the operation of my device, I mount the parallel bars 3 within the wheel rim by riveting the lugs 4 to the interior of the rim. On the side of the parallel bars 3 I mount a brace plate 12. Between the bars 3 I slidably mount the sectional members 5, 6 and 7, said members 5 being positioned in the opposing recesses of the bars as previously described. Upon pulling out on the handle 9 of the hinged central section 7 the sections 5 and 6 with the forked or bifurcated ends 8 are drawn inwardly providing the clearance for the insertion of the parallel bars 3 within the rim 1 for fastening. A tire and its rim may be mounted upon the ring carrier and the sliding handle section 7 is pushed in which moves outwardly the bifurcated ends 8 in contact with the tire and the rim. The bifurcated ends 8 clamp as a guard on each side of the surface of the tire 2 and its rim and holds them firmly in place. The parallel guide pins 11 also move inwardly between the bars 3 together with the tongue 13 and the ends pass beyond the plate 12. The wedge shaped member 15 is then inserted in the opening 14 of the tongue 13 and a suitable padlock is positioned in the opening 16 of the wedge member 15, thus locking the tire and its rim firmly in position on the ring carrier.

Having thus described my invention, what I claim as new and for which I desire Letters Patent is:—

1. In a locking means for tire carriers, the combination with a ring carrier of two parallel bars mounted within the ring carrier and provided with opposing recesses, a sliding sectional member composed of pivotally united sections disposed within the recesses of the parallel bars, forked lugs projecting from the outer ends of the opposite end sections for engaging a tire rim, a tongue member having an opening therein projecting inwardly from the central section, a key wedge removably mounted in the opening in the tongue and locking means for securing the wedge in position.

2. In a locking means for tire carriers, the combination with a ring carrier of two parallel bars mounted within the ring carrier and provided with opposing recesses, a jointed locking bar slidably mounted in said recesses said locking bar comprising a central portion and jointed sections secured thereto, the end sections being provided with bifurcations for encompassing the tire rim, a tongue projecting inwardly from the central member of the slidable locking bar, said tongue being provided with an opening, guide pins also projecting inwardly from said central member, a wedge member provided with an opening in its lower end for insertion in the opening in the tongue and a lock for engagement with the opening in the wedge.

3. In a locking means for tire carriers, the combination with a ring carrier, of two parallel bars mounted within the ring carrier and provided with opposing recesses, a sliding sectional member composed of pivotally united sections disposed between said bars and mounted in said recesses, lugs projecting from the outer ends of the opposite end sections of the sectional member for engaging a tire rim, a tongue member projecting inwardly from the central section of the sectional member, and means for locking the tongue to hold the pivotally united sections of the sectional member in alignment.

In testimony whereof I have affixed my signature.

ORLO K. WARWICK.